United States Patent
Geng (10) Patent No.: US 10,970,489 B2
(45) Date of Patent: Apr. 6, 2021

(54) SYSTEM FOR REAL-TIME EXPRESSION OF SEMANTIC MIND MAP, AND OPERATION METHOD THEREFOR

(71) Applicant: SHANGHAI BANPO NETWORK TECHNOLOGIES LTD., Shanghai (CN)

(72) Inventor: Yibing Geng, Shanghai (CN)

(73) Assignee: SHANGHAI BANPO NETWORK TECHNOLOGIES LTD., Shanghai (CN)

( * ) Notice: Subject to any disclaimer, the term of this patent is extended or adjusted under 35 U.S.C. 154(b) by 0 days.

(21) Appl. No.: 16/314,840

(22) PCT Filed: Mar. 30, 2018

(86) PCT No.: PCT/CN2018/081327
§ 371 (c)(1),
(2) Date: Jan. 2, 2019

(87) PCT Pub. No.: WO2018/177411
PCT Pub. Date: Oct. 4, 2018

(65) Prior Publication Data
US 2020/0012722 A1 Jan. 9, 2020

(30) Foreign Application Priority Data
Apr. 1, 2017 (CN) .......................... 201710213799.6

(51) Int. Cl.
*G06F 40/30* (2020.01)
*G06F 16/93* (2019.01)
(Continued)

(52) U.S. Cl.
CPC .............. *G06F 40/30* (2020.01); *G06F 16/93* (2019.01); *G06F 16/951* (2019.01);
(Continued)

(58) Field of Classification Search
CPC ........ G06F 40/30; G06F 16/93; G06F 16/951; G06F 40/284; G06K 9/00463; G06K 9/00469
See application file for complete search history.

(56) References Cited

U.S. PATENT DOCUMENTS 9,436,760 B1 * 9/2016 Tacchi ..................... G06F 16/36
9,558,265 B1 * 1/2017 Tacchi ..................... G06N 5/022
(Continued)

FOREIGN PATENT DOCUMENTS

CN 101281530 A 10/2008
CN 102222115 A 10/2011
(Continued)

*Primary Examiner* — Abul K Azad
(74) *Attorney, Agent, or Firm* — Global IP Services; Tianhua Gu (57) ABSTRACT

Disclosed is a system for real-time expression of a semantic mind map and its operation method there for. The system includes an association matrix and a focus associated operation module, the association matrix is connected to the focus associated operation module. The association matrix includes a start node, a direct associated module, an indirect associated module, a weakly associated module, a superscript module, or the like. The focus associated operation module includes a focused node and focus associated nodes, or the like. When the present disclosure is applied to a search engine including a cross-database search engine, a search result service interface is in real time expanded, thus being used to help a user better identify and discover relevant documents of interest.

11 Claims, 3 Drawing Sheets

(51) Int. Cl.
*G06F 16/951* (2019.01)
*G06F 40/284* (2020.01)
*G06K 9/00* (2006.01)

(52) U.S. Cl.
CPC ....... *G06F 40/284* (2020.01); *G06K 9/00463* (2013.01); *G06K 9/00469* (2013.01)

(56) References Cited

U.S. PATENT DOCUMENTS

| | | | |
|---|---|---|---|
| 9,645,999 B1* | 5/2017 | Ciulla | G06F 16/35 |
| 2010/0223276 A1* | 9/2010 | Al-Shameri | G06K 9/0063 |
| | | | 707/769 |
| 2016/0012044 A1* | 1/2016 | Franceschini | G06F 16/951 |
| | | | 707/722 |
| 2017/0103439 A1* | 4/2017 | Kolb | G06F 16/93 |

FOREIGN PATENT DOCUMENTS

| | | |
|---|---|---|
| CN | 104598629 A | 5/2015 |
| CN | 104933032 A | 9/2015 |
| CN | 107133271 A | 9/2017 |

\* cited by examiner

SYSTEM FOR REAL-TIME EXPRESSION OF SEMANTIC MIND MAP, AND OPERATION METHOD THEREFOR

CROSS REFERENCE TO RELATED PATENT APPLICATION

The present application is the US national stage of PCT/CN2018/081327 filed on Mar. 30, 2018, which claims the priority of the Chinese patent application No. CN201710213799.6 filed on Apr. 1, 2017, which application is incorporated herein by reference.

BACKGROUND OF THE PRESENT DISCLOSURE

Field of Disclosure

The present disclosure relates to an expression system and an operation method therefor, and in particular, to a system for real-time expression of a semantic mind map and an operation method therefor.

Description of Related Arts

A document search engine generally provides a group of relevant document lists based on a search query. There are also plenty of search engines try to further segment and classify some features of documents in a document search result (for example, segmenting and classifying a search result chronologically or segmenting and classifying a search result by authors), to help users better distinguish and identify relevant documents of interest.

The existing presentation for a search result lacks a means of uncovering underneath complex semantic network relationship between text words in real time, and cannot meanwhile uncover co-occurrence of text words to indicate relevant document.

SUMMARY OF THE PRESENT DISCLOSURE

A technical problem to be resolved by the present disclosure is to provide a system for real-time expression of a semantic mind map and an operation method therefor, the system is capable of constructing an M*N association matrix by using featured text words in a document, uncovering a multilevel semantic network relationship between text information based on the association matrix, and uncovering co-occurrence of text words to indicate relevant document. When the present disclosure is applied to a search engine or a cross-database search engine, a search result service interface is in real time expanded, thus helping a user better identify and discover relevant documents of interest.

The present disclosure resolves the foregoing technical problem by the following technical solution: a system for real-time expression of a semantic mind map, comprising:

an association matrix, connected to a focus associated operation module, wherein the association matrix comprises a start node, a direct associated module, an indirect associated module, a weakly associated module, and a superscript module, wherein the start node (also referred to as a key node), connected to the direct associated module, and configured to mark the first left column (also referred to as a key column) of the association matrix on a display interface, the start node may be 1 to M featured text words, an initial value may be featured user query words;

the direct associated module, connected to the indirect associated module, and configured to mark a node in subsequent right columns of the start node in the association matrix which has a text in-sentence co-occurrence relationship with featured text words in the first key column;

the indirect associated module, connected to the weakly associated module, is configured to mark a node in subsequent right columns of a direct associated node in the association matrix which has a text in-sentence co-occurrence relationship with a featured text word of a previous direct associated node but not previously marked;

the weakly associated module, configured to mark a nodes in subsequent right columns of an indirect associated node in the association matrix which has an in-sentence co-occurrence relationship with a featured text word of the indirect associated node but not previously marked, and in order to reduce hierarchical complexity, the weakly associated module is further configured to mark all remaining nodes in the association matrix;

a superscript module, giving an upper-right superscript of each node in the association matrix, and configured to mark the number of relevant documents of the node in a current search result subset; and the focus associated operation module comprises a focused node and a focus associated node, wherein the focused node is configured to select a node in the association matrix and make the node to be a current focused node; and the focus associated node, connected to the focused node, and configured to mark all nodes in columns of the association matrix and having an in-sentence or in-document co-occurrence relationship with the featured text word of the focused node.

Preferably, a numeral upper-left superscript of the focus related node marks the number of documents of a current focus relevant node which has in-document co-occurrence with the featured text word of the focused node; and a numeral lower-left superscript of the focus related node marks the number of sentences of the current focus relevant node which has in-sentence co-occurrence with the featured text word of the focused node.

Preferably, the association matrix is restricted by a display area of a screen interface, which is an M*N association matrix, nodes in the association matrix are featured text words (also referred to as semantic nodes) parsed and extracted from a search text document, and M and N are natural numbers.

The present disclosure further provides a method for operating a system for real-time expression of a semantic mind map, comprising the following steps:

step 90, obtaining a real-time data source for the semantic mind map;

step 91, extracting featured text words for the semantic mind map;

step 92, composing basic data of an association matrix of the semantic mind map;

step 93, presenting and expressing the semantic mind map;

step 94, performing a focused node of the semantic mind map;

step 95, performing a document uncovering within the semantic mind map; and step 96, recomposing the semantic mind map.

The step 90 comprises the following steps:

step 1, in a document search process, capturing the first returned documents of the searching result in real time, that is, dynamically obtaining Top-N (first N, N is a natural number) documents associated with a reader's query; and step 2, capturing text from a document title and its abstract, or even from its full text content.

The step 91 comprises the following steps:

step 10, pre-processing of the text information: segmenting a text into sentences, and further segmenting into free text words or free text phrases; and step 11, extracting stemmed segments of free text words or free text phrases as featured text words, such that each text sentence is a bag of featured text words and an experienced weight is given to each text sentence based on its document weight in the search result and its position weight within the current document.

The step 92 is a process of divergence in knowledge discovery, comprising the following steps:

step 20, defining a basic data set of the semantic mind map to an M*N association matrix;

step 21, using featured text words from a reader's search query as a start node on the first left column of the semantic mind map;

step 22, using all the featured text words from the current column, searching all the sentences from the search result for their associated featured text words (having an in-sentence co-occurrence relationship);

step 23, removing any new duplicated featured text word comparing with the ones on the left columns of the association matrix;

step 24, selecting M new featured text words with weight descending ordered as a new column for the association matrix; and step 25, repeating the step 22 to the step 24 until N columns of data are all completed.

The step 93 is a process of hierarchy convergence of knowledge discovery, comprising the following steps:

step 30, presenting the semantic mind map by giving, based on a basic data set, an M*N association matrix, four different node types were assigned to all node elements in the association matrix, respectively; a start node, a direct associated node, an indirect associated node, and a weakly associated node;

step 31, defining the first left column on the association matrix as a start node of the current semantic mind map;

step 32, marking a node as a direct associated node for any node in all its subsequent right columns of the start node which has a text in-sentence co-occurrence relationship with featured text words of the start node;

step 33, marking a node as an indirect associated node for any unmarked node in all its subsequent right columns of the direct associated node which has a text in-sentence co-occurrence relationship with featured text words of those previous direct associated node;

step 34, marking a node as a weakly associated node for any unmarked node in all its subsequent right columns of the indirect associated node which has a text in-sentence co-occurrence relationship with featured text words of those previous indirect associated node, and in order to reduce hierarchical complexity, marking all remaining unmarked nodes in the association matrix as weakly associated nodes; and step 35, marking, at its upper-right superscript of each node in the association matrix, a digital number which represents the number of relevant documents of the node in a current search result subset.

The step 94 is a knowledge association and discovery process, comprising the following steps:

step 40, selecting a semantic node in the association matrix and making the node a current focused node, to indicate that the current node is an interested node selected by a user;

step 41, calculating all nodes which having in-sentence co-occurrence or in-document co-occurrence with the featured text word of the focused node and marking those nodes as focus associated nodes;

step 42, by means of an upper-left superscript of the focus associated node to mark a number of relevant documents of the node which having in-document co-occurrence with a featured text word of the focused node; and step 43, by means of a lower-left superscript of the focus associated node to mark the number of frequency of the node which having in-sentence co-occurrence with the featured text word of the focused node.

The step 95 is uncovering links between the semantic node and its specific document, comprising the following steps:

step 50, clicking on a node's superscript of the semantic mind map, such than the system pops up a window of detailed relevant document to which the superscript links; and step 51, in a document detail window, clicking on a specific document and the window will turn to a specific document display page of its original search engine.

The step 96 comprises the following steps:

step 60, dragging a semantic node in the association matrix of the current semantic mind map to the position of the left key column, so that the dragged node's featured text word becomes a new keyword (a start node); and step 61, recomposing a new semantic mind map based on an original document search result by using the new keyword.

Benefits of the present disclosure lie in that: while on a searching topic, by using the presenting mode of an association matrix, an expanded semantic mind map with hierarchical semantic concept network relationship being uncovered, and direct associated relationship of any node in the association matrix being uncovered; and also, different superscripts of each semantic node can uncover its relevant documents in the search result; uncover frequency of in-sentence co-occurrence between relevant nodes, or number of relevant documents in-document co-occurrence between related nodes, and a sequence of semantic weight of each column in the association matrix is maintained. When the present disclosure is applied to a search engine comprising a cross-database search engine, a search result service interface is in real time expanded, thus helping a user better identify and discover relevant documents of interest.

BRIEF DESCRIPTION OF THE DRAWINGS

Wherein in FIG. 2 and FIG. 3,  indicates a direct associated node  indicates an indirect associated node  indicates a weakly associated node

DETAILED DESCRIPTION OF THE PREFERRED EMBODIMENTS

The following describes preferable embodiments of the present disclosure in combination with the accompanying drawings, to explain the technical solutions of the present disclosure in detail.

Figure 1:
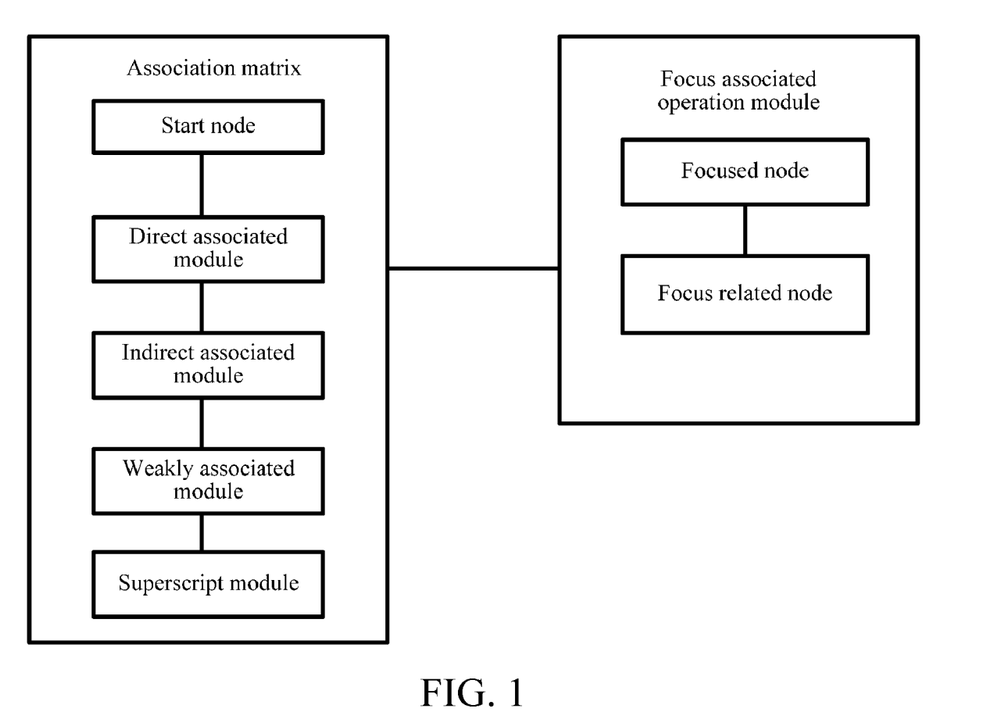
FIG. 1 is a structural schematic diagram according to the present disclosure.

As shown in FIG. 1, a system for real-time expression of a semantic mind map according to the present disclosure comprises an association matrix and with its focus associated operation module the association matrix comprises a start node, a direct associated module, an indirect associated module, a weakly associated module, and a superscript module, wherein the start node, connected to the direct associated module, and configured to mark the first left column (also referred to as a key column) of the association matrix on a display interface, the start node may be 1 to M featured text words, an initial value may be featured user query words;

the direct associated module, connected to the indirect associated module, and configured to mark a node in subsequent right columns of the start node in the association matrix which has a text in-sentence co-occurrence relationship with featured text words in the first key column;

the indirect associated module, connected to the weakly associated module, is configured to mark a node in subsequent right columns of a direct associated node in the association matrix which has a text in-sentence co-occurrence relationship with a featured text word of a previous direct associated node but not previously marked;

the weakly associated module, configured to mark a nodes in subsequent right columns of an indirect associated node in the association matrix which has an in-sentence co-occurrence relationship with a featured text word of the indirect associated node but not previously marked, and in order to reduce hierarchical complexity, the weakly associated module is further configured to mark all remaining nodes in the association matrix;

a superscript module, giving an upper-right superscript of each node in the association matrix, and configured to mark the number of relevant documents of the node in a current search result subset; and the focus associated operation module comprises a focused node and a focus associated node, wherein the focused node is configured to select a node in the association matrix and make the node to be a current focused node; and the focus associated node, connected to the focused node, and configured to mark all nodes in columns of the association matrix and having an in-sentence or in-document co-occurrence relationship with the featured text word of the focused node.

a numeral upper-left superscript of the focus related node marks the number of documents of a current focus relevant node which has in-document co-occurrence with the featured text word of the focused node; and a numeral lower-left superscript of the focus related node marks the number of sentences of the current focus relevant node which has in-sentence co-occurrence with the featured text word of the focused node.

The association matrix is restricted by a display area of a screen interface, which is an M*N association matrix, nodes in the association matrix are featured text words (also referred to as semantic nodes) parsed and extracted from a search text document, and M and N are natural numbers.

The method for operating a system for real-time expression of a semantic mind map of the present disclosure comprises the following steps:

step 90, obtaining a real-time data source for the semantic mind map;

step 91, extracting featured text words for the semantic mind map;

step 92, composing basic data of an association matrix of the semantic mind map;

step 93, presenting and expressing the semantic mind map;

step 94, performing a focused node of the semantic mind map;

step 95, performing a document uncovering within the semantic mind map; and step 96, recomposing the semantic mind map.

The step 90 comprises the following steps:

Step 1: In a document search process, capturing the first returned documents of the searching result in real time, that is, dynamically obtaining Top-N (first N, N is a natural number) documents associated with a reader's query; and Step 2: Capturing text from a document title and its abstract, or even from its full text content.

The step 91 comprises the following steps:

Step 10: Pre-processing of the text information: segmenting a text into sentences, and further segmenting into free text words or free text phrases.

Step 11: Extracting stemmed segments of free text words or free text phrases as featured text words, such that each text sentence is a bag of featured text words and an experienced weight is given to each text sentence based on its document weight in the search result and its position weight within the current document.

The step 92 is a process of divergence in knowledge discovery, comprising the following steps:

Step 20: Defining a basic data set of the semantic mind map to an M*N association matrix.

Step 21: Using featured text words from a reader's search query as a start node on the first left column of the semantic mind map.

Step 22: Using all the featured text words from the current column, searching all the sentences from the search result for their associated featured text words (having an in-sentence co-occurrence relationship).

Step 23: Removing any new duplicated featured text word comparing with the ones on the left columns of the association matrix.

Step 24: Selecting M new featured text words with weight descending ordered as a new column for the association matrix (a sequence for each column in the association matrix is maintained).

Step 25: Repeating the step 22 to the step 24 until N columns of data are all completed.

The step 93 is a process of hierarchy convergence of knowledge discovery, comprising the following steps:

Step 30: Presenting the semantic mind map by giving, based on a basic data set, an M*N association matrix, four different node types were assigned to all node elements in the association matrix, respectively; a start node, a direct associated node, an indirect associated node, and a weakly associated node;

Step 31: Defining the first left column on the association matrix as a start node of the current semantic mind map.

Step 32: Marking a node as a direct associated node for any node in all its subsequent right columns of the start node which has a text in-sentence co-occurrence relationship with featured text words of the start node;

Step 33: Marking a node as an indirect associated node for any unmarked node in all its subsequent right columns of the direct associated node which has a text in-sentence co-occurrence relationship with featured text words of those previous direct associated node;

Step 34: Marking a node as a weakly associated node for any unmarked node in all its subsequent right columns of the indirect associated node which has a text in-sentence co-occurrence relationship with featured text words of those previous indirect associated node, and in order to reduce hierarchical complexity, marking all remaining unmarked nodes in the association matrix as weakly associated nodes;

Step 35: Marking, at its upper-right superscript of each node in the association matrix, a digital number which represents the number of relevant documents of the node in a current search result subset.

The step 94 is a knowledge association and discovery process, comprising the following steps:

Step 40: Selecting a semantic node in the association matrix and making the node a current focused node (displayed in highlight), to indicate that the current node is an interested node selected by a user;

Step 41: Calculating all nodes which having in-sentence co-occurrence or in-document co-occurrence with the featured text word of the focused node and marking those nodes as focus associated nodes;

Step 42: By means of an upper-left superscript of the focus associated node to mark a number of relevant documents of the node which having in-document co-occurrence with a featured text word of the focused node;

Step 43: By means of a lower-left superscript of the focus associated node to mark the number of frequency of the node which has in-sentence co-occurrence with the featured text word of the focused node.

The step 95 is uncovering links between the semantic node and its specific document, comprises the following steps:

Step 50: Clicking on a node's superscript of the semantic mind map, such than the system pops up a window of detailed relevant document to which the superscript links;

Step 51: In a document detail window, clicking on a specific document and the window will turn to a specific document display page of its original search engine.

The step 96 comprises the following steps:

Step 60: Dragging a semantic node in the association matrix of the current semantic mind map to the position of the left key column, so that the dragged node's featured text word becomes a new keyword (a start node);

Step 61: recomposing a new semantic mind map based on an original document search result by using the new keyword.

The steps described above provides a real time heuristic and divergent mind map for a user to better distinguish and identify relevant documents of interest, which is largely differed from traditional searching result representation.

The heuristic and divergent mind map has the following features:

I. A semantic related network is uncovered by an association matrix with an M*N dimension. The first left start column is as start nodes, and a subsequent $n^{th}$ column of data is deducted by $(n-1)^{th}$ columns of node elements from a document search result subset.

II. Four types of hierarchical semantic relationship are uncovered. Starting from a key node (in the first left column), direct associated nodes, indirect associated nodes, and weakly associated nodes are deducted and uncovered.

III. The search result subset is further classified and segmented by using the number of relevant documents shown by the upper-right superscript of each semantic node in the semantic mind map.

IV. Co-occurring documents between relevant nodes is uncovered. When a node is selected as an interested node (referred to as a focused node), the system will deduct and uncover all its direct associated nodes in the current mind map, meanwhile uncover relevant documents which have in-document co-occurrence of the focused node by means of an upper-left superscript of the node, and uncover relevant documents which have in-sentence co-occurrence of the focused node by means of a lower-left superscript of the node.

V. Nodes in a vector space of any single column of the semantic mind map have sequence characteristic order based on semantic weight of its featured text word and its document weight in time sequence.

The present disclosure composes a dynamic real-time semantic mind map based on featured text words from search result and provides a group of heuristic semantic association operations with respect to the mind map, to excite a divergent mind of a reader and perform rapid locating and retrieving relevant document in a search process.

Embodiment

A system in this embodiment comprises a semantic mind map display interface. The semantic mind map display interface is a 20*6 association matrix, and node elements in the matrix are featured text words parsed and extracted from documents of a search result subset.

Figure 2:
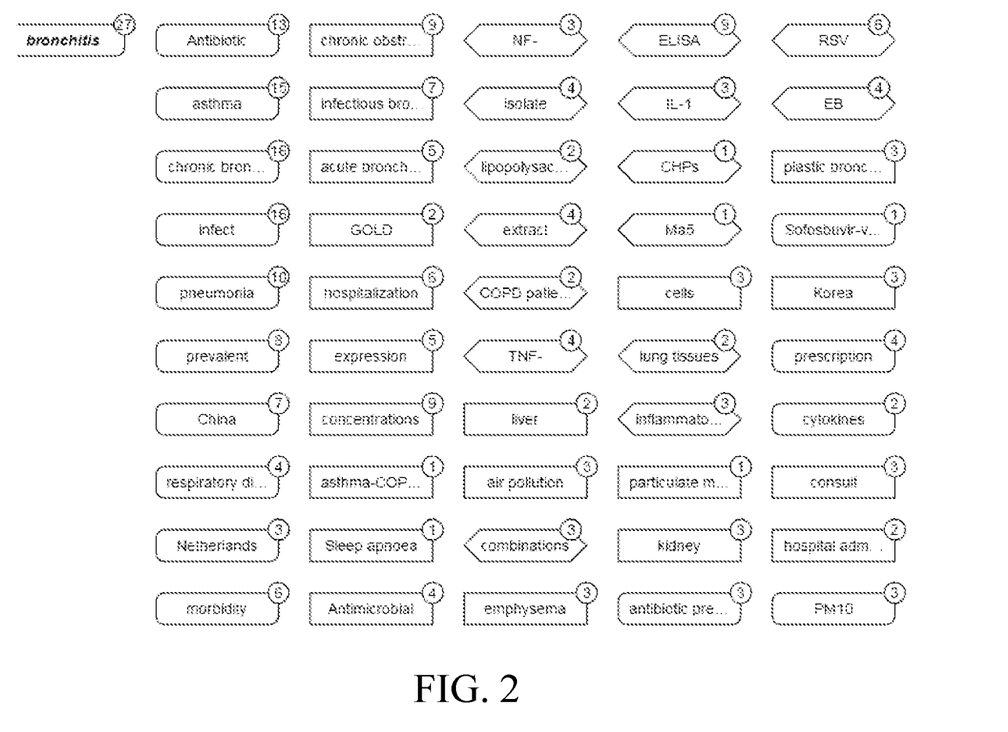
FIG. 2 is a structural schematic diagram of a display interface according to the present disclosure.

As shown in FIG. 2, in this embodiment, there are four different types of nodes in the association matrix:

A start node: for example, a current query word from a user is "bronchitis".

Direct associated nodes: for example, a node element in the second column and the first row is "antibiotic", and a node element in the sixth column and the seventh row is "cytokines".

Indirect associated nodes: for example, a node element in the third column and the ninth row is "sleep apnea" and a node element in the fourth column and the tenth row is "emphysema".

Weakly associated nodes: for example, a node element in the fifth column and the second row is "IL-1" (interleukin-1) and a node element in the fifth column and the sixth row is "lung tissues".

An upper-right superscript of each element (node) in the association matrix is configured to mark the number of relevant documents of the node (the featured text word) in a current search result subset.

A weight (degree of significance) of the node "antibiotic" in the second column and the first row is greater than or equal to that of the node "asthma" in the same column and the second row, and a weight of the node in the second row is greater than the node "chronic bronchitis" in the same column and the third row, and so on.

This embodiment is directed to a heuristic knowledge association and divergent mind expression mode for a real-time document search result, which reprocesses and integrates document retrieved with deep mining of document text content in a semantic level (co-occurrence relationship).

Figure 3:
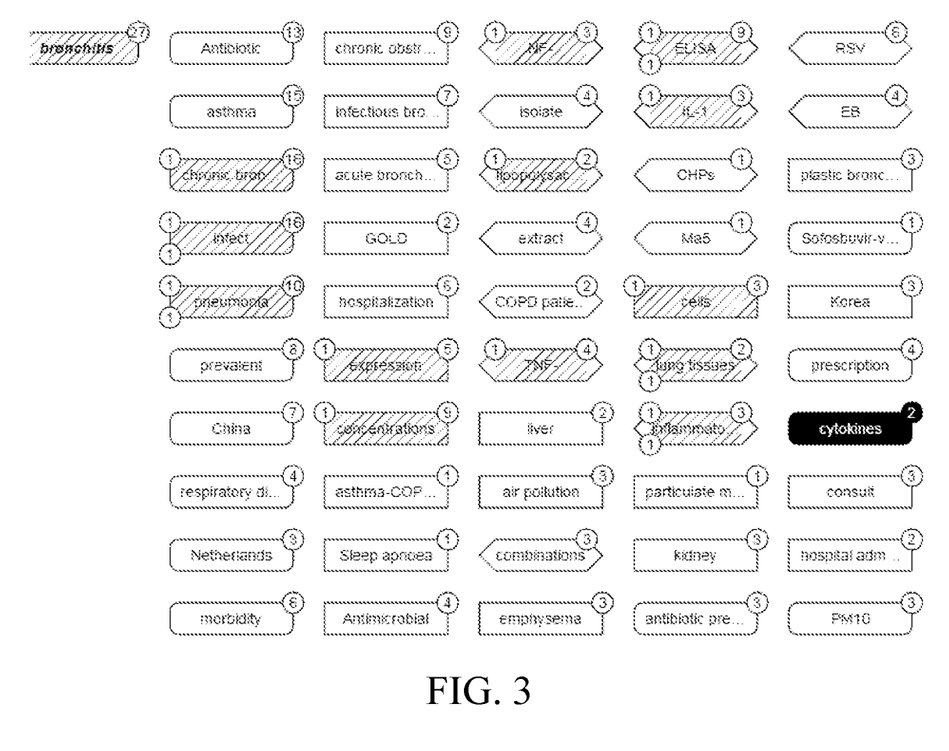
FIG. 3 is a structural schematic diagram of a focused node according to the present disclosure.

As shown in FIG. 3, in this embodiment, the system for real-time expression of a semantic mind map also comprises:

A focus associated operation: selecting a node in an association matrix and making the node a current focused node. For example, the node element "cytokines" in the sixth column and the seventh row is selected (highlighted) as a current node of interest, the nodes such as node element "pneumonia" in the second column and the fifth row, the node element "IL-1" (interleukin-1) in the fifth column and the second row, and the node element "lung tissues" in the fifth column and the sixth row are prompted as direct associated nodes (shadow-lighted) of the current focused node.

An upper-left superscript of the focus associated node marks the number of documents which has in-document co-occurrence with the featured text word of the focused node.

A lower-left superscript of the focus associated node marks the number of documents which has in-sentence co-occurrence with the featured text word of the focused node.

The specific embodiments further describe the technical problem to be resolved, the technical solutions, and the beneficial effects consistent with the present disclosure. It should be understood that the above descriptions are only specific embodiments consistent with the present disclosure, but are not intended to limit the present disclosure. Any modification, equivalent replacement, or improvement made within the spirit and principle of the present disclosure shall fall within the protection scope consistent with the present disclosure.

What is claimed is:

1. A system for real-time expression of a semantic mind map, comprising:
    an association matrix, connected to a focus associated operation module, wherein the association matrix comprises a start node, a direct associated module, an indirect associated module, a weakly associated module, and a superscript module, wherein
    the start node, connected to the direct associated module, and configured to mark a first left column of the association matrix on a display interface, the start node is 1 to M featured text words, an initial value is featured user query words, and M is a natural number;
    the direct associated module, connected to the indirect associated module, and configured to mark a node in subsequent right columns of the start node in the association matrix which has a text in-sentence co-occurrence relationship with featured text words;
    the indirect associated module, connected to the weakly associated module, and configured to mark a node in subsequent right columns of a direct associated node in the association matrix which has a text in-sentence co-occurrence relationship with a featured text word of a previous direct associated node but not previously marked;
    the weakly associated module, configured to mark a nodes in subsequent right columns of an indirect associated node in the association matrix which has an in-sentence co-occurrence relationship with a featured text word of the indirect associated node but not previously marked, and in order to reduce hierarchical complexity, the weakly associated module is further configured to mark all remaining nodes in the association matrix;
    a superscript module, giving an upper-right superscript of each node in the association matrix, and configured to mark the number of relevant documents of the node in a current search result subset; and
    the focus associated operation module comprises a focused node and a focus associated node, wherein
    the focused node is configured to select a node in the association matrix and make the selected node to be a current focused node; and
    the focus associated node, connected to the focused node, and configured to mark all nodes in columns of the association matrix and having an in-sentence or in-document co-occurrence relationship with the featured text word of the focused node.

2. The system for real-time expression of a semantic mind map according to claim 1, wherein a numeral upper-left superscript of the focus related node marks a number of documents of a current focus relevant node which has in-document co-occurrence with the featured text word of the focused node; and a numeral lower-left superscript of the focus related node marks a number of sentences of the current focus relevant node which has in-sentence co-occurrence with the featured text word of the focused node.

3. The system for real-time expression of a semantic mind map according to claim 1, wherein the association matrix is restricted by a display area of a screen interface, which is an M*N association matrix, nodes in the association matrix are featured text words parsed and extracted from a search text document, and M and N are natural numbers.

4. The system for real-time expression of a semantic mind map according to claim 1, wherein in a same column of the association matrix, a weight of an $(m-1)^{th}$ row of nodes is greater than or equal to a weight of an $m^{th}$ row of nodes.

5. A method for operating a system for real-time expression of a semantic mind map, comprising the following steps:
    step 90, obtaining a real-time data source for the semantic mind map;
    step 91, extracting featured text words for the semantic mind map;
    step 92, composing basic data of an association matrix of the semantic mind map;
    step 93, presenting and expressing the semantic mind map;
    step 94, performing a focused node to the semantic mind map;
    step 95, performing a document uncovering to the semantic mind map;
    step 96, recomposing the semantic mind map;
    wherein the step 93 is a process of hierarchy convergence of knowledge discovery, comprising the following steps:
    step 30, presenting the semantic mind map by giving, based on a basic data set, an M*N association matrix, four different node types were assigned to all node elements in the association matrix, respectively; a start node, a direct associated node, an indirect associated node, and a weakly associated node;
    step 31, defining the first left column on the association matrix as a start node of the current semantic mind map;
    step 32, marking a node as a direct associated node for any node in all its subsequent right columns of the start node which has a text in-sentence co-occurrence relationship with featured text words of the start node;
    step 33, marking a node as an indirect associated node for any unmarked node in all its subsequent right columns of the direct associated node which has a text in-sentence co-occurrence relationship with featured text words of those previous direct associated node;

step 34, marking a node as a weakly associated node for any unmarked node in all its subsequent right columns of the indirect associated node which has a text in-sentence co-occurrence relationship with featured text words of those previous indirect associated node, and in order to reduce hierarchical complexity, marking all remaining unmarked nodes in the association matrix as weakly associated nodes; and step 35, marking, at the upper-right superscript of each node in the association matrix, a digital number which represents the number of relevant documents of the node in a current search result subset.

6. The method for operating a system for real-time expression of a semantic mind map according to claim 5, wherein the step 90 comprises the following steps:

step 1, in a document search process, capturing the first returned documents of the searching result in real time, that is, dynamically obtaining Top-N documents associated with a reader's query; and step 2, capturing text from a document title and its abstract, or capturing text from a document title, its abstract, and its full text content.

7. The method for operating a system for real-time expression of a semantic mind map according to claim 5, wherein the step 91 comprises the following steps:

step 10, pre-processing of the text information: segmenting a text into sentences, and further segmenting into free text words or free text phrases; and step 11, extracting stemmed segments of free text words or free text phrases as featured text words, such that each text sentence is a bag of featured text words and an experienced weight is given to each text sentence based on its document weight in the search result and its position weight within the current document.

8. The method for operating a system for real-time expression of a semantic mind map according to claim 5, wherein the step 92 is a process of divergence in knowledge discovery, comprising the following steps:

step 20, defining a basic data set of the semantic mind map to an M*N association matrix;

step 21, using featured text words from a reader's search query as a start node on the first left column of the semantic mind map;

step 22, using all the featured text words from the current column, searching all the sentences from the search result for their associated featured text words;

step 23, removing any duplicated featured text word comparing with the ones on the left columns of the association matrix;

step 24, selecting M new featured text words with weight descending ordered as a new column for the association matrix; and step 25, repeating the step 22 to the step 24 until N columns of data are all completed.

9. The method for operating a system for real-time expression of a semantic mind map according to claim 5, wherein the step 94 is a knowledge association and discovery process, comprising the following steps:

step 40, selecting a semantic node in the association matrix and making the node a current focused node, to indicate that the current node is an interested node selected by a user;

step 41, calculating all nodes which having in-sentence co-occurrence or in-document co-occurrence with the featured text word of the focused node and marking those nodes as focus associated nodes;

step 42, by means of an upper-left superscript of the focus associated node to mark the number of relevant documents of the node which having in-document co-occurrence with a featured text word of the focused node; and step 43, by means of a lower-left superscript of the focus associated node to mark the number of frequency of the node which having in-sentence co-occurrence with the featured text word of the focused node.

10. The method for operating a system for real-time expression of a semantic mind map according to claim 5, wherein the step 95 is uncovering links between the semantic node and a specific document, comprising the following steps:

step 50, clicking on a node's superscript of the semantic mind map, such that the system pops up a window of detailed relevant document to which the superscript links; and step 51, in a document detail window, clicking on a specific document and the window will turn to a specific document display page of an original search engine.

11. The method for operating a system for real-time expression of a semantic mind map according to claim 5, wherein the step 96 comprises the following steps:

step 60, dragging a semantic node in the association matrix of the current semantic mind map to a position of the left key column, so that the dragged node's featured text word becomes a new keyword and step 61, recomposing a new semantic mind map based on an original document search result by using the new keyword.

* * * * *